(12) United States Patent
Gao et al.

(10) Patent No.: US 7,885,670 B2
(45) Date of Patent: Feb. 8, 2011

(54) METHOD AND SYSTEM FOR COMMUNICATION OF A DUAL-MODE TERMINAL

(75) Inventors: Quanzhong Gao, Shenzhen (CN); Ying Tan, Shenzhen (CN); Shikui Guo, Shenzhen (CN); Qingshun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 723 days.

(21) Appl. No.: 11/866,116

(22) Filed: Oct. 2, 2007

(65) Prior Publication Data

US 2008/0248817 A1    Oct. 9, 2008

Related U.S. Application Data

(63) Continuation of application No. PCT/CN2006/000560, filed on Mar. 30, 2006.

(30) Foreign Application Priority Data

Apr. 4, 2005    (CN) ............... 2005 1 0059960
Apr. 12, 2005   (CN) ............... 2005 1 0063555
Apr. 20, 2005   (CN) ............... 2005 1 0067543

(51) Int. Cl.
*H04Q 7/20* (2006.01)
(52) U.S. Cl. .............. 455/458; 455/127.4; 455/515; 370/335; 370/320
(58) Field of Classification Search ........... 455/560, 455/426.1, 466, 411, 518, 519, 458, 445, 455/415, 414.1, 456, 455; 370/328, 395.31, 370/310, 320, 331, 352, 312, 522, 355; 709/203, 709/249
See application file for complete search history.

(56) References Cited

U.S. PATENT DOCUMENTS 5,878,343 A * 3/1999 Robert et al. ........... 455/424

(Continued)

FOREIGN PATENT DOCUMENTS

CN    1568072 A    1/2005

(Continued)

OTHER PUBLICATIONS

State Intellectual Property Office of the People's Republic of China, Written Opinion of the International Searching Authority in International Patent Application No. PCT/CN2006/000560 (Jun. 22, 2006).

(Continued)

*Primary Examiner*—Tan Trinh
(74) *Attorney, Agent, or Firm*—Leydig, Voit & Mayer, Ltd.

(57) ABSTRACT

The invention discloses a communication method of a dual-mode terminal, including: a Mobile Switch Centre (MSC) sends a message containing calling party information to an access functional entity of a High Rate Packet Data (HRPD) network via an InterWorking Solution (IWS) after receiving an initiated paging to a dual-mode terminal in the HRPD network; the access functional entity of the HRPD network sends a message containing the calling party information to the dual-mode terminal; the dual-mode terminal performs a subsequent communication according to the received calling party information. In the invention, upon receiving initiated paging from a dual-mode terminal in an HRPD network, the MSC sends a message containing the calling party information to an access functional entity of the HRPD network via the IWS, complexity of message processing is decreased, time of message processing is reduced.

17 Claims, 5 Drawing Sheets

U.S. PATENT DOCUMENTS

| | | | |
|---|---|---|---|
| 7,483,415 B2 * | 1/2009 | Yeom | 370/352 |
| 7,526,320 B2 * | 4/2009 | Semper | 455/560 |
| 2004/0209614 A1 * | 10/2004 | Bright et al. | 455/426.1 |
| 2005/0188113 A1 * | 8/2005 | Lee et al. | 709/249 |
| 2005/0197104 A1 * | 9/2005 | Liu et al. | 455/411 |
| 2006/0035672 A1 * | 2/2006 | Semper | 455/560 |
| 2006/0073841 A1 * | 4/2006 | Narasimha et al. | 455/458 |
| 2006/0114885 A1 * | 6/2006 | Baek et al. | 370/352 |
| 2006/0116149 A1 * | 6/2006 | Dunn et al. | 455/518 |
| 2006/0126582 A1 * | 6/2006 | Saifullah et al. | 370/338 |
| 2006/0147004 A1 * | 7/2006 | Moss et al. | 379/114.01 |
| 2006/0274692 A1 * | 12/2006 | Ryu | 370/331 |

FOREIGN PATENT DOCUMENTS

| | | |
|---|---|---|
| CN | 1571322 A | 1/2005 |
| CN | 1849001 A | 10/2006 |
| CN | 100401843 C | 7/2008 |
| KR | 2005-0022465 A | 3/2005 |
| KR | 2005-0029316 A | 3/2005 |
| WO | WO 2004/079947 A1 | 9/2004 |

OTHER PUBLICATIONS

Korean Intellectual Property Office, Korean Notice of Final Rejection in Korean Application No. 10-2007-7025539 (Jan. 29, 2010).

$3^{rd}$ Generation Partnership Project 2 "3GPP2," "Interoperability Specification (IOS) for High Rate Packet Data (HRPD) Access Network Interfaces—Rev A.," Publication Version—3GPP2 A.S0007-A v1.0 (Sep. 2002).

Dongming et al., "cdma2000 High Rate Packet Data," China Academic Journal Electronic Publishing House, Network Technology, Telecommunications Network Technology, Issue 4 (Apr. 2003).

Yunqi, "Introduction to the HRPD Interoperability System," China Academic Journal Electronic Publishing House, Telecommunications Network Technology, No. 8 (Aug. 8, 2003).

* cited by examiner

METHOD AND SYSTEM FOR COMMUNICATION OF A DUAL-MODE TERMINAL

This application is a continuation of International Patent Application No. PCT/CN2006/000560, filed Mar. 30, 2006, which claims priority to Chinese Patent Application No. 200510067543.6, filed Apr. 20, 2005, Chinese Patent Application No. 200510063555.1, filed Apr. 12, 2005, and Chinese Patent Application No. 200510059960.6, filed Apr. 4, 2005, all of which are hereby incorporated by reference.

FIELD OF TECHNOLOGY

The present invention relates to wireless communication technologies, and more particularly, to a communication method of a dual-mode terminal.

BACKGROUND OF THE INVENTION

According to 3rd Generation Partnership Project 2 (3GPP2) standards, a Code Division Multiple Access (CDMA) system and a High Rate Packet Data (HRPD) system adopt two relatively independent networking architectures, respectively. FIG. 1 shows a diagram illustrating the networking architectures of a CDMA2000 1x system and an HRPD system. As shown in FIG. 1, the two network systems share no more interworking interface besides a Packet Data Service Node (PDSN).

The HRPD protocol defines that a voice service has the highest priority. Therefore a dual-mode terminal supporting both a CDMA network and an HRPD network must at the same time be able to answer a voice paging from the CDMA network while carrying out a data service in the HRPD network. Thus, when the dual-mode terminal is activated in the HRPD network, the dual-mode terminal has to switch to the CDMA network periodically according to a paging interval of the CDMA network to intercept a paging message on a paging channel of the CDMA network. If a paging message is intercepted, the data service in the HRPD network is switched to an HRPD Dormant state of the HRPD network, and the dual-mode terminal is switched to the CDMA network to establish a forward/reverse service channel. After that, the network side sends calling party information through the established service channel to the dual-mode terminal, and the dual-mode terminal provides the calling party information to the user. If the user answers the call, a Page Response message will be returned to the CDMA network side and the subsequent network initial call procedure will be performed. If the user does not answer the call, the dual-mode terminal will return to the HRPD network and re-activate the data service in the HRPD Dormant state.

The switching between the CDMA network and the HRPD network results in discontinuity of a service and at the same time, a long time switching process may interrupt data services having high demands for real-time performance, such as a Voice Over Internet Protocol (VoIP), a video phone, a Push to Talk (PTT) and a stream media, in a switching process. Therefore, the user's service experience is adversely affected. Moreover, a frequent switching and searching between two networks makes the dual-mode terminal an energy-hungry device.

As shown in FIG. 2, to solve the above problems, a function of forwarding a message of the CDMA network, such as a paging message, a short message and a system message, through the HRPD network is added to the air interface of the HRPD network, and the function is expanded to receive a paging message from the HRPD network when a service is carried out in the CDMA network. Meanwhile, a mechanism of HRPD-CDMA forwarding a paging message to each other is introduced to a transmit interface. In other words, an Inter-Working Solution (IWS) for forwarding a paging message is added between a Mobile Switching Controller (MSC) and an access functional entity of the HRPD. The access functional entity of the HRPD refers to an HRPD Packet Control Function (PCF)/Access Network (AN). In this solution, the HRPD PCF/AN is managed as a Base Station Controller (BSC) of the CDMA network and the MSC maintains location areas of the two networks at the same time. A dual-mode terminal needs to register a location area of the CDMA network through a location area code update message in the MSC when residing in the HRPD network. The flow chart of communication of the dual-mode terminal in this architecture is shown in FIG. 3 and the specific blocks are as follows.

In block 301: when receiving a paging message from the network side, the MSC sends two messages, a Paging Request message and a Feature Notification message. The feature Notification message carries calling party information to the dual-mode terminal via the IWS, the HRPD PCF/AN, respectively, in sequence, and sends a Paging Request message to a Base Station System (BSS) of the CDMA network at the same time.

In block 302: the dual-mode terminal starts a timer to wait for the subsequent Feature Notification message after receiving the Paging Request message, and returns a response message to the HRPN PCF/AN after receiving the Feature Notification message.

If the timer of the dual-mode terminal passes a time threshold, the dual-mode terminal will no longer wait for the Feature Notification message, and the dual-mode terminal will switch to the CDMA network directly and return a Paging Response message.

In block 303: the dual-mode terminal provides the calling party information carried in the Feature Notification message to a receiving user, and the receiving user chooses whether to answer the voice paging.

In block 304: the dual-mode terminal determines whether the receiving user answers the voice paging. If the receiving user answers the voice paging, the dual-mode terminal switches to a data service which is being performed to the HRPD Dormant state, switches to the CDMA network and returns a Page Response message to the BSS. If the receiving user doesn't answer the voice paging, the dual-mode terminal keeps carrying out the data service in the HRPD network.

As can be seen from the above descriptions, in the method shown in FIG. 3, the dual-mode terminal does not need to search a message frequently in the two networks but the dual-mode terminal needs to deal with two messages, that is, a Paging Request message and a Feature Notification message, and the processing is relatively complex. Furthermore, if the Feature Notification message does not arrive in time after the Paging Request message is received, the subsequent processing cannot be performed until the timer passes a time threshold, and as a result, the time of processing is extended.

SUMMARY OF THE INVENTION

A communication method of a dual-mode terminal is provided.

The technical solution in accordance with some embodiments of the present invention is as follows.

A method for communication of a dual-mode terminal, including: sending, by a Mobile Switching Center (MSC), a first message containing calling party information to an access functional entity of a High Rate Packet Data (HRPD) network via an InterWorking Solution (IWS) in response to receiving a paging to a dual-mode terminal in the HRPD network; sending, by the access functional entity of the HRPD network, a second message containing the calling party information to the dual-mode terminal in response to receiving the first message; determining, by the dual-mode terminal, whether to accept or reject the paging according to the received calling party information.

A Mobile Switching Center (MSC) for communication of a dual-mode terminal, in which the MSC is configured to send a first message containing calling party information to an access functional entity of a High Rate Packet Data (HRPD) network via an InterWorking Solution (IWS) in response to receiving a paging to a dual-mode terminal in the HRPD network.

An access functional entity of a High Rate Packet Data (HRPD) network for communication of a dual-mode terminal, in which the access functional entity of the HRPD network is configured to receive a first message containing calling party information via an InterWorking Solution (IWS) from a Mobile Switching Center (MSC), and send a second message containing the calling party information to a dual-mode terminal in the HRPD network.

A system for communication of a dual-mode terminal, including a Mobile Switching Center (MSC), an access functional entity of a High Rate Packet Data (HRPD) network and a dual-mode terminal, in which the MSC is configured to send a first message containing calling party information to the access functional entity of the HRPD network via an Inter-Working Solution (IWS) in response to receiving a paging to the dual-mode terminal in the HRPD network; the access functional entity of the HRPD network is configured to receive the first message containing the calling party information via the IWS from the MSC, and send a second message containing the calling party information to the dual-mode terminal; the dual-mode terminal is configured to receive the second message from the access functional entity of the HRPD network, and determine whether to accept or reject the paging according to the received calling party information in the second message.

Compared with the prior arts, in the method provided by embodiments of the present invention, upon receiving an initiated paging to a dual-mode terminal in the HRPD network, the MSC sends a message containing the calling party information to the access functional entity of the HRPD network via the IWS, so as to reduce the number of paging related messages and the time for the message processing and decrease complexity of the message processing.

DETAILED DESCRIPTION OF THE INVENTION

In accordance with embodiments of the present invention, when a user performs a paging to a CDMA/HRPD dual-mode terminal in the HRPD active state through the CDMA network, a MSC sends a message containing calling party information to the dual-mode terminal through the HRPD network and thus notifies the dual-mode terminal of the calling party information. The dual-mode terminal determines whether to answer the voice paging.

The CDMA network in embodiments of the present invention may include: a network based on the CDMA system, a network based on the CDMA2000 1x system, a network based on the CDMA 2000 1x EVolution Data and Voice (EVDV) system. However, the present invention is not limited to these types of networks.

The present invention is hereinafter further described in detail with reference to the drawings and some detailed embodiments.

An IWS is required to be provided between the MSC and the access functional entity of the HRPD network, such as, an HRPD PCF/AN, in the embodiments of the present invention. The MSC manages the access functional entity of the HRPD network as a BSS of the CDMA network. Thus, a paging message of the CDMA network can be sent to a dual-mode terminal via the A1 interface via the HRPD network.

Figure 1:
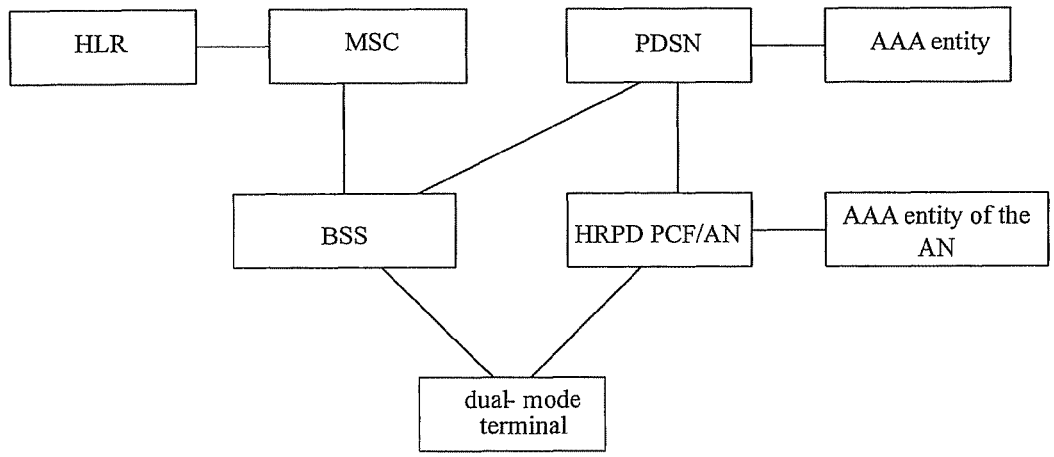
FIG. 1 shows a conventional diagram of networking architectures of a CDMA2000 1x system and an HRPD system.
Figure 2:
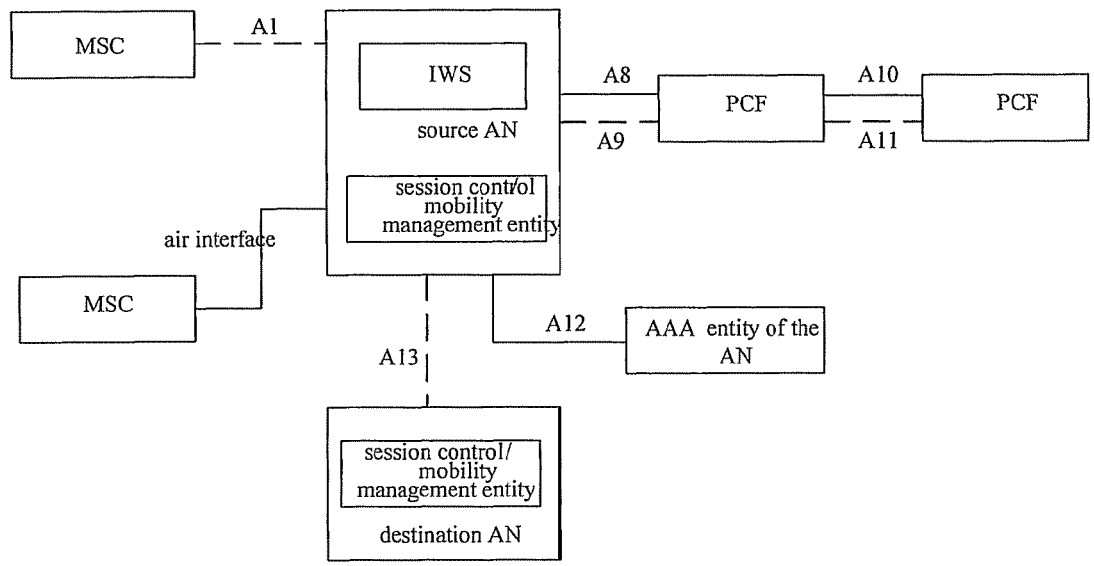
FIG. 2 shows a conventional diagram of a networking architecture of an HRPD network with an IWS.
Figure 3:
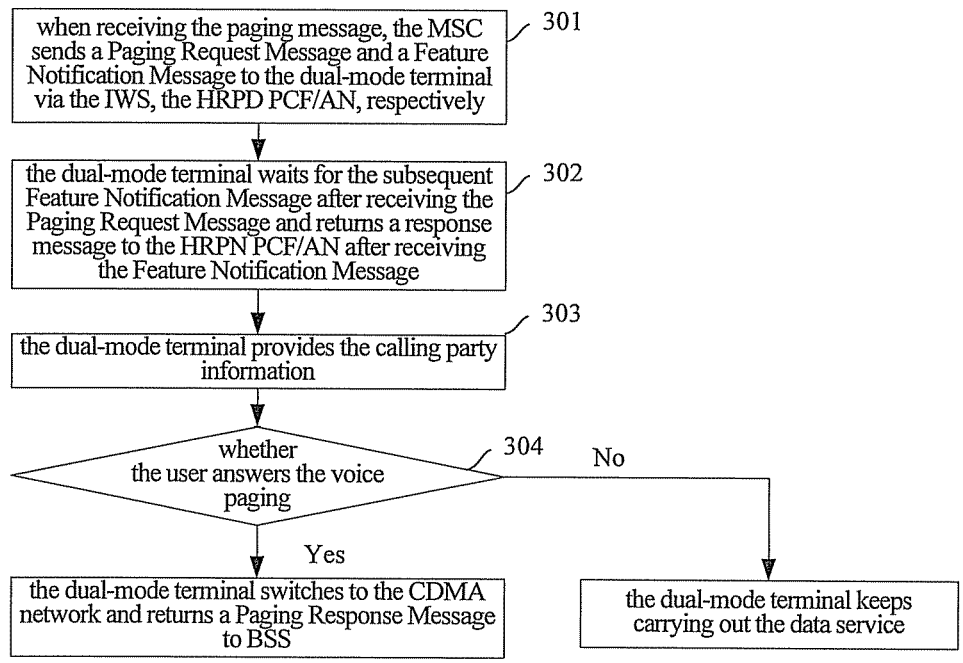
FIG. 3 shows a conventional flow chart of existing communication of a dual-mode terminal in the architecture shown in FIG. 2.
Figure 4:
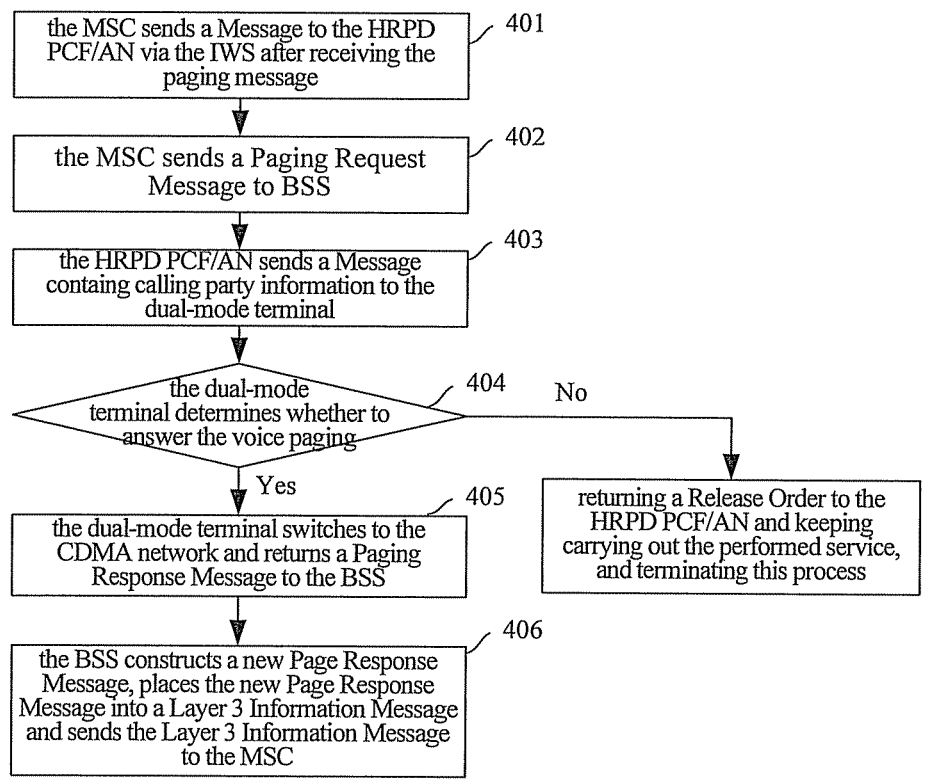
FIG. 4 shows a flow chart of the communication of a dual-mode terminal provided by embodiments of the present invention.

FIG. 4 shows a flow chart of the communication of a dual-mode terminal provided by embodiments of the present invention.

In block 401, an MSC receives a paging message containing calling party information as well as the subscriber Identification (ID) of the called party; detects the subscriber ID of the called party in the paging message points to a dual-mode terminal in the HRPD network; and then, the MSC sends a message containing the calling party information to the HRPD PCF/AN of the location area where the dual-mode terminal is located.

The MSC stores subscriber IDs of all the dual-mode terminals subordinate to the MSC itself.

The message containing the calling party information includes a Paging Request message or a Feature Notification message.

After the MSC receives the paging message and before the MSC sends the message to the HRPD PCF/AN, the communication method of the dual-mode terminal further includes the following processes: the MSC determines whether the calling party information in the paging message is available. If the calling party information in the paging message is available, the MSC has the calling party information carried in the message. Otherwise, the MSC has a prescribed value carried in the message as the calling number of the calling party information, or directly returns a Rejection message to the calling user.

In block 402, the MSC sends a Paging Request message containing a Virtual Paging Instruction (VPI) identity, which indicates that the Paging Request message does not need to be sent via an air interface, to one or more BSS of the CDMA network in the location area where the dual-mode terminal is located, and begins the timer substantially at the same time.

The Paging Request message may or may not carry the calling party information. If the message containing the calling party information in block 401 is a Paging Request message and a Paging Request message in this block does not carry the calling party information, the MSC must determine the access functional entity in the location area is an HRPD PCF or a CDMA BSS before sending two different Paging Request messages. The determining process can be implemented using either of the following two schemes.

Scheme 1: the MSC determines that the access functional entity is an HPRD PCF or a CDMA BSS according to information of the location area where the dual-mode terminal is located, a corresponding association between the information of the location area and type identities of HRPD PCF/AN stored by the MSC, and a corresponding association between the information of the location area and type identities of CDMA BSS stored by the MSC.

Scheme 2: the MSC determines that the access functional entity is an HPRD PCF or a CDMA BSS according to information of a signalling point connected with the MSC, a corresponding association between the information of the signalling point and type identities of HRPD PCF/AN stored by the MSC, and a corresponding association between the information of the signalling point and type identities of CDMA BSS stored by the MSC.

Furthermore, if the MSC does not receive a Page Response message or a Rejection message from the HRPD network or the CDMA network before the timer passes a time threshold, the MSC returns information indicating that the called party is not in a service location area to the calling user.

In block 403, the HRPD PCF/AN sends a message containing the calling party information to the dual-mode terminal through a forward service channel after receiving the message containing the calling party information.

In this block, if the message containing the calling party information sent by the MSC is a Paging Request message, then another message sent to the dual-mode terminal by the HRPD PCF/AN is a General Page message containing the calling party information or a General Page message and a Feature Notification message which carries the calling party information, both of the General Page message and the Feature Notification message can be packed into one MAC packet to be sent to the dual-mode terminal at the same time. Thus, by reducing the number of the Feature Notification messages sent by the access functional entity of the HRPD to the dual-mode terminal to one, or packing two Feature Notification messages to one Media Access Control (MAC) packet to be sent, the complexity of the message processing is further decreased and the time of the message processing is further reduced. If the message containing the calling party information sent by the MSC is a Feature Notification message, the message sent to the dual-mode terminal by the HRPD PCF/AN is a Feature Notification message containing the calling party information.

In block 404, the dual-mode terminal determines whether to answer the voice paging, i.e., whether to accept or reject the voice paging, after receiving the message sent by the HRPD PCF/AN, if determining to answer the voice paging, the dual-mode terminal performs block 405. If determining not to answer the voice paging, the dual-mode terminal returns a Release Order to the HRPD PCF/AN, keeps carrying out the performed service, and terminates this process.

The Release Order may carry a value indicating the rejection reason, such as user busy.

After the dual-mode terminal determines not to answer the voice paging and returns the Release Order to the HRPD PCF/AN, the communication method of the dual-mode terminal further includes the following processes: if the HRPD PCF/AN receives a Paging Request message or a Feature Notification message containing a re-sending instruction sent by the MSC after receiving the Release Order, the HRPD PCF/AN rejects the message sent by the MSC again. Or, after the dual-mode terminal determines not to answer the voice paging and returns the Release Order to the HRPD PCF/AN, the communication method of the dual-mode terminal further includes the following processes: the HRPD network forwards the Rejection message to the MSC after receiving the Release Order and the MSC will no longer send a Paging Request message or a Feature Notification message to the HRPD PCF/AN again after receiving the forwarded Rejection message.

In block 405, the dual-mode terminal releases an HRPD connection. In other words, the dual-mode terminal switches the performed HRPD service to the HRPD Dormant state; switches to the CDMA network; and returns a Page Response message to the BSS.

In block 406, the BSS constructs a new Page Response message according to the Page Response message sent by the dual-mode terminal; places the new constructed Page Response message into a Complete Layer 3 Information message and sends the Complete Layer 3 Information message to the MSC. The MSC connects the calling party and the called party after receiving the Complete Layer 3 Information message.

Figure 5:
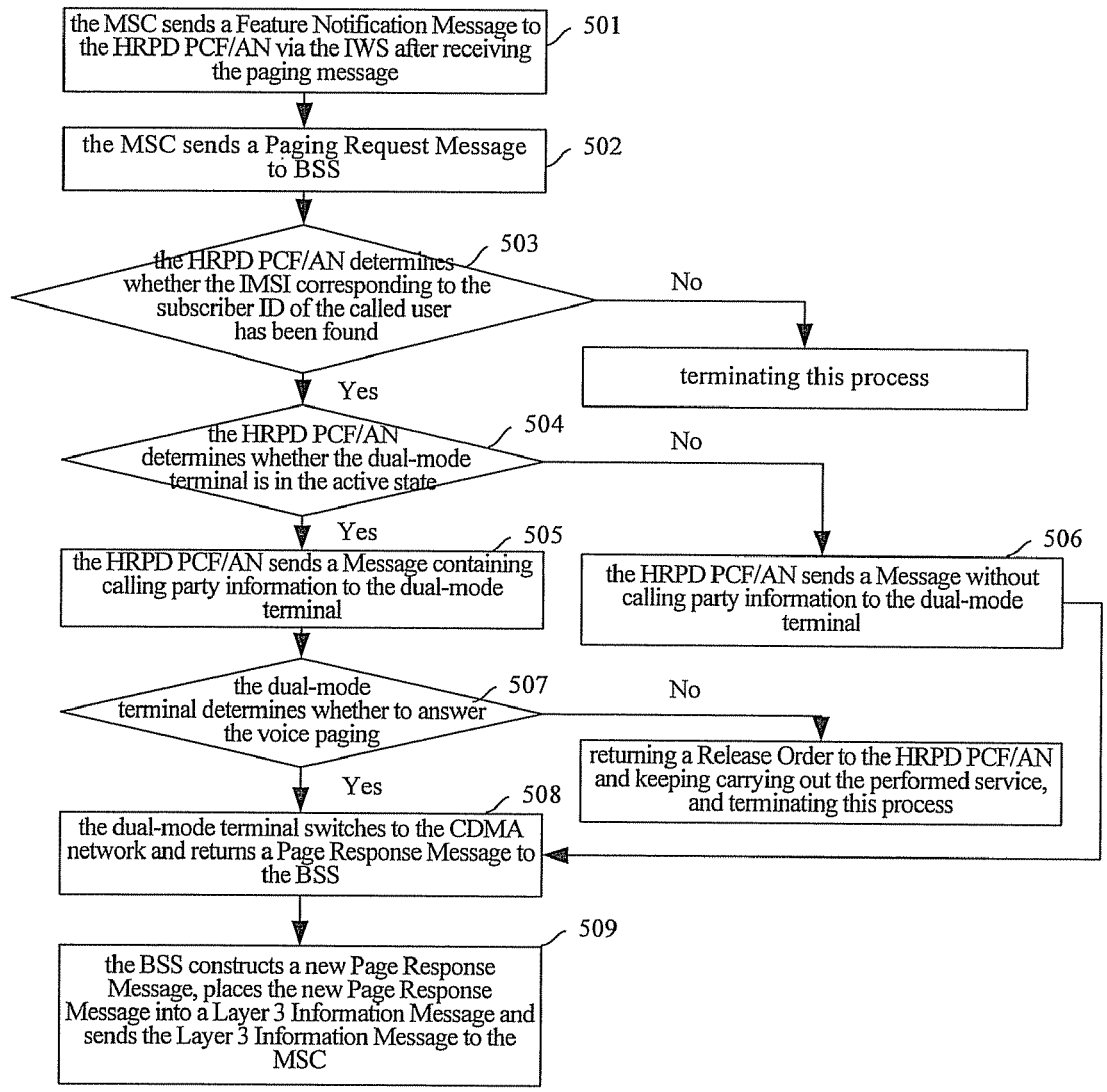
FIG. 5 shows a flow chart of the communication of a dual-mode terminal provided by an embodiment of the present invention.

FIG. 5 shows a flow chart of the communication of a dual-mode terminal provided by an embodiment of the present invention.

Block 501 and block 502 are similar to block 401 and block 402, respectively.

In block 503, upon receiving the message, the HRPD PCF/AN determines whether the IMSI corresponding to the subscriber ID of the called party in the message is available in itself. If the IMSI corresponding to the subscriber ID of the called party in the message has been found in the MSC, block 504 is performed. Otherwise, this process is terminated.

The HRPD PCF/AN stores a corresponding association between subscriber IDs and IMSIs of the terminals belonging to the HRPD PCF/AN itself.

In block 504, the HRPD PCF/AN determines whether the dual-mode terminal is in the HRPD active state according to the found IMSI. If the dual-mode terminal is in the HRPD active state, block 505 is performed. Otherwise, performing actions in block 506.

The HRPD PCF/AN stores a corresponding association between the IMSI of a dual-mode terminal and the HRPD state of the dual-mode terminal, i.e., the active state or an idle state.

In block 505, the HRPD PCF/AN sends a message containing the calling party information to the dual-mode terminal through a forward service channel and the process continues with block 507.

In block 506, the HRPD PCF/AN sends a message without the calling party information to the dual-mode terminal through the forward service channel and the process continues with block 508.

In block 507, the dual-mode terminal in the HRPD active state determines whether to answer the voice paging, i.e., whether to accept or reject the voice paging, after receiving the message sent by the HRPD PCF/AN, if the dual-mode terminal in the HRPD active state determines to answer the voice paging, block 508 is performed. Otherwise, the dual-mode terminal returns a Rejection message to the HRPD PCF/AN, keeps carrying out the performed service and terminates this process.

Block 508 and block 509 are similar to block 405 and block 406, respectively.

Figure 6:
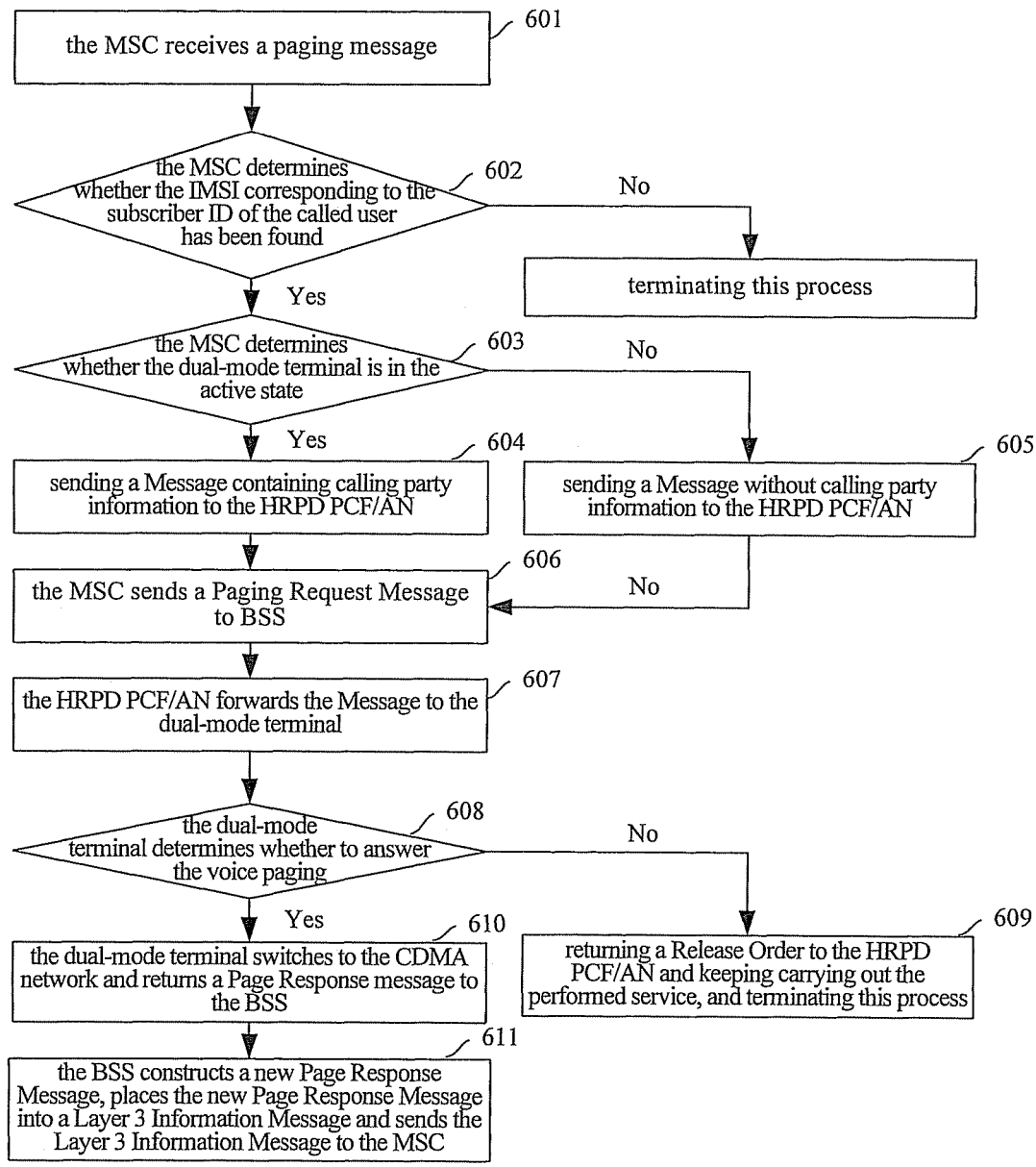
FIG. 6 shows a flow chart of the communication of a dual-mode terminal provided by an embodiment of the present invention.

FIG. 6 shows a flow chart of the communication of a dual-mode terminal provided by an embodiment of the present invention.

In block 601, the MSC receives a paging message containing calling party information and the subscriber ID of the called party sent by the network side, detects that the subscriber ID of the called party in the paging message points to a dual-mode terminal in the HRPD network.

In block 602, the MSC determines whether the IMSI corresponding to the subscriber ID of the called party in the paging message has been found in itself, if the IMSI corresponding to the subscriber ID of the called party in the paging message has been found in the MSC itself, actions in block 603 are performed. Otherwise, this process is terminated.

The MSC stores a corresponding association between subscriber IDs and IMSIs of terminals associating to the MSC itself.

In block 603, the MSC determines whether the dual-mode terminal is in the HRPD active state according to a corresponding association between the IMSI of the dual-mode terminal and HRPD state of the dual-mode terminal stored in the MSC. If the dual-mode terminal is in the HRPD active state, actions in block 604 are performed. Otherwise, actions in block 605 are performed.

The HRPD PCF/AN reports the HRPD state of the dual-mode terminal to the MSC when detecting that the HRPD state of the dual-mode terminal has been changed. The MSC receives and stores the corresponding association between the IMSI of the dual-mode terminal and the HRPD state of the same dual-mode terminal, i.e., the active state or the idle state.

In block 604, the MSC sends a message containing the calling party information to the HRPD PCF/AN of the location area where the dual-mode terminal is located via the IWS, and the process continues with block 606.

In block 605, the MSC sends a message without the calling party information to the HRPD PCF/AN of the location area where the dual-mode terminal is located via the IWS.

In block 606, the MSC sends a Paging Request message containing a VPI identity to one or more BSS of the CDMA network in the location area where the dual-mode terminal is located and starts up the timer at the same time.

In block 607, upon receiving the message, the HRPD PCF/AN forwards the message containing the calling party information or the message without the calling party information sent by the MSC to the dual-mode terminal through a forward service channel.

In block 608, upon receiving the message sent by the HRPD PCF/AN, the dual-mode terminal determines whether the message carries the calling party information. If the message carries the calling party information, block 609 is performed. Otherwise, block 610 is performed.

In block 609, the dual-mode terminal determines whether to answer the voice paging, i.e., whether to accept or reject the voice paging, according to the calling party information. If the dual-mode terminal determines to answer the voice paging, block 610 is performed. Otherwise, the dual-mode terminal returns a Rejection message to the HRPD PCF/AN, keeps carrying out the performed service and terminates this process.

Block 610 and block 611 are similar to block 405 and block 406, respectively.

Figure 7:
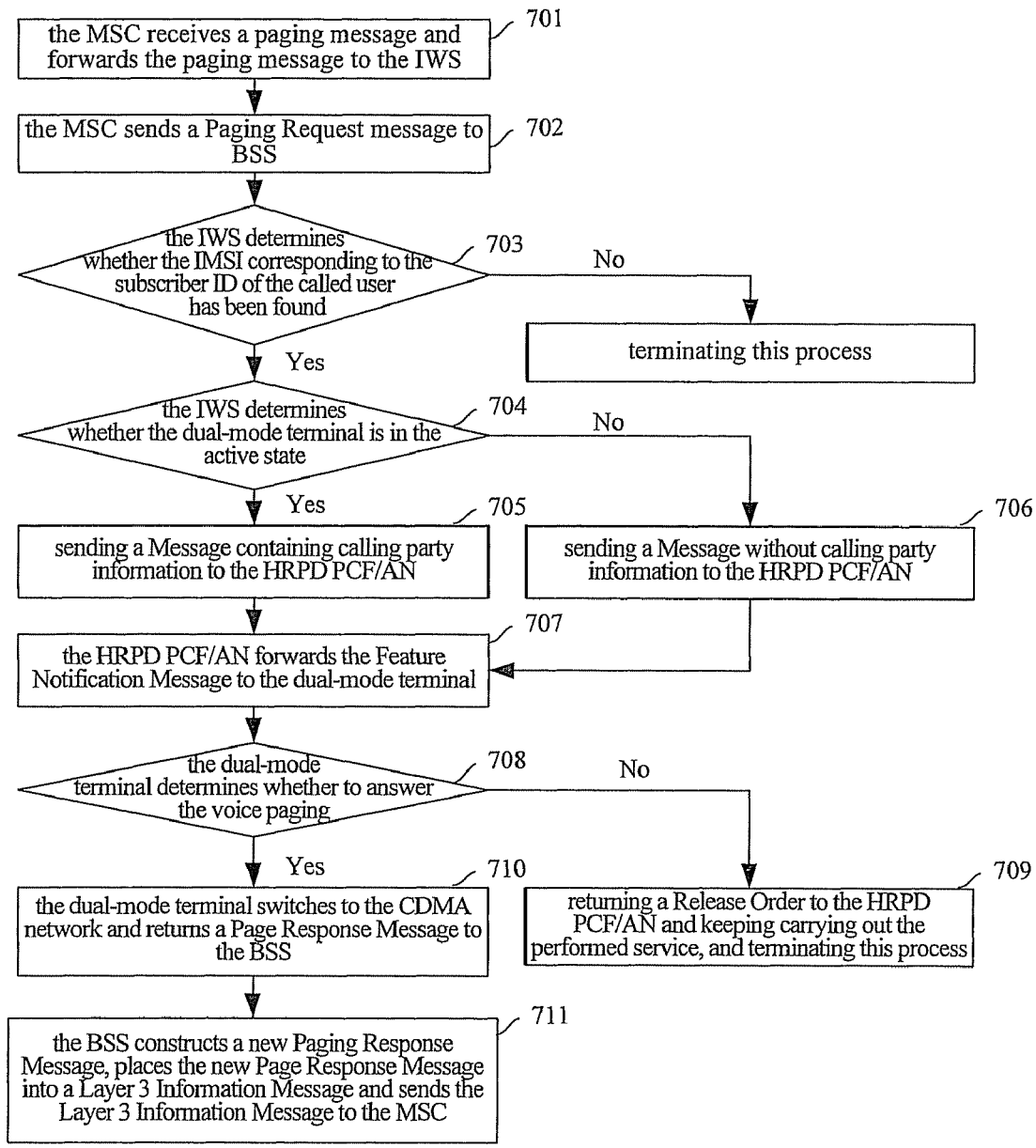
FIG. 7 shows a flow chart of the communication of a dual-mode terminal provided by an embodiment of the present invention.

FIG. 7 shows a flow chart of the communication of a dual-mode terminal provided by an embodiment of the present invention.

In block 701, upon receiving a paging message containing calling party information and the subscriber ID of the called party sent by the network side and detecting that the subscriber ID of the called party in the paging message points to a dual-mode terminal in the HRPD network, the MSC sends a message containing the calling party information to the IWS.

In block 702: the MSC sends a Paging Request message containing a VPI identity to one or more BSS of the CDMA network in the location area where the dual-mode terminal is located and starts the timer at the same time.

In block 703: upon receiving the message, the IWS determines whether the IMSI corresponding to the subscriber ID of the called party in the message has been found in itself. If the IMSI corresponding to the subscriber ID of the called party in the message has been found in the IWS itself, block 704 is performed. Otherwise, block 705 is performed.

The IWS stores a corresponding association between subscriber IDs and IMSIs of the terminals belonging to the IWS itself.

In block 704, the IWS determines whether the dual-mode terminal is in the HRPD active state according to HRPD states of dual-mode terminals stored in the IWS. If the IWS determines the dual-mode terminal is in the HRPD active state, block 705 is performed. Otherwise, block 706 is performed.

The HRPD PCF/AN reports the HRPD state of the dual-mode terminal to the IWS when detecting that the HRPD state of the dual-mode terminal has been changed. The IWS receives and stores the corresponding association between the IMSI of the dual-mode terminal and the HRPD state of the same dual-mode terminal, i.e., the active state or the idle state.

In block 705, the IWS sends a message containing the calling party information to the HRPD PCF/AN, and the process continues with block 707.

In block 706, the IWS sends a message without the calling party information to the HRPD PCF/AN.

In block 707, the HRPD PCF/AN forwards the message to the dual-mode terminal through a forward service channel after receiving the message containing the calling party information or the message without the calling party information.

In block 708, upon receiving the message sent by the HRPD PCF/AN, the dual-mode terminal determines whether the message carries the calling party information. If the dual-mode terminal determines the message carries the calling party information, block 709 is performed. Otherwise, block 710 is performed.

In block 709, the dual-mode terminal determines whether to answer the voice paging, i.e., whether to accept or reject the voice paging, according to the calling party information. If the dual-mode terminal determines to answer the voice paging, block 710 is performed. Otherwise, the dual-mode terminal returns a Rejection message to the HRPD PCF/AN, keeps carrying out the performed service and terminates this process.

Block 710 and block 711 are similar to block 405 and block 406, respectively.

An MSC for communication of a dual-mode terminal is provided. Specifically speaking, the MSC is configured to send a first message containing calling party information to an access functional entity of an HRPD network via an IWS in response to receiving a paging to a dual-mode terminal in the HRPD network.

The first message may include a Paging request message, and the MSC is further configured to send a Paging request message containing the calling party information to a BSS of a CDMA network in a location area where the dual-mode terminal is located.

The MSC may further be configured to:

receive and store an association between an International Mobile Subscriber Identity (IMSI) and an HRPD state of the dual-mode terminal which is reported by the access functional entity of the HRPD network;

determine whether the dual-mode terminal is in an active state based on the stored association in the MSC;

send the first message containing the calling party information via the IWS if determining the dual-mode terminal is in an active state.

The MSC may further be configured to adopt a prescribed value as the calling party information in response to detecting the calling party information in the paging is unavailable.

An access functional entity of an HRPD network for communication of a dual-mode terminal is provided. Specifically speaking, the access functional entity of the HRPD network may be configured to receive a first message containing calling party information via an IWS from an MSC, and to send a second message containing the calling party information to a dual-mode terminal in the HRPD network.

The first message may include a Paging Request message, the second message may include a Feature Notification message containing the calling party information and a General Page message, the access functional entity of the HRPD network may be further configured to pack the Feature Notification message and the General Page message into an MAC packet.

The access functional entity of the HRPD network may be further configured to report an association between an International Mobile Subscriber Identity (IMSI) and an HRPD state of the dual-mode terminal to the MSC or the IWS.

The access functional entity of the HRPD network may be further configured to:

determine whether the dual-mode terminal is in an active state based on an association between the IMSI and the HRPD state of the dual-mode terminal which is stored in the access functional entity of the HRPD network;

send the second message containing the calling party information to the dual-mode terminal if determining the dual-mode terminal is in an active state.

A system for communication of a dual-mode terminal is provided. Specifically speaking, the system may include an MSC, an access functional entity of an HRPD network and a dual-mode terminal, in which the MSC may be configured to send a first message containing calling party information to the access functional entity of the HRPD network via an IWS in response to receiving a paging to the dual-mode terminal in the HRPD network;

the access functional entity of the HRPD network may be configured to receive the first message containing the calling party information via the IWS from the MSC, and send a second message containing the calling party information to the dual-mode terminal;

the dual-mode terminal may be configured to receive the second message from the access functional entity of the HRPD network, and determine whether to accept or reject the paging according to the received calling party information in the second message.

In view of the foregoing description it will be evident to a person skilled in the art that many modifications and variations are possible, all of which fall within the scope of the invention.

The invention claimed is:

1. A method for communication of a dual-mode terminal, comprising:

sending, by a Mobile Switching Center (MSC), a first message containing calling party information to an access functional entity of a High Rate Packet Data (HRPD) network via an InterWorking Solution (IWS) in response to receiving a paging to a dual-mode terminal in the HRPD network;

sending, by the access functional entity of the HRPD network, a second message containing the calling party information to the dual-mode terminal in response to receiving the first message;

determining, by the dual-mode terminal, whether to accept or reject the paging according to the received calling party information;

switching, by the dual-mode terminal, to a Code Division Multiple Access (CDMA) network and sending, by the dual-mode terminal, a Paging Response message to a Base Station Subsystem (BSS) if the dual-mode terminal determines to accept the paging; and sending, by the dual-mode terminal, a Release Order to the access functional entity of the HRPD network if the dual-mode terminal determines to reject the paging.

2. The method according to claim 1, wherein the first message comprises a Paging Request message, the second message comprises a Feature Notification message containing the calling party information and a General Page message.

3. The method according to claim 2, before sending the second message containing the calling party information to the dual-mode terminal, the method further comprising:

packing, by the access functional entity of the HRPD network, the General Page message and the Feature Notification message into a Media Access Control (MAC) packet.

4. The method according to claim 1, wherein the first message comprises a Paging request message, after receiving by the MSC a paging to a dual-mode terminal in the HRPD network, the method further comprises:

sending, by the MSC, a Paging request message containing the calling party information to the BSS in the CDMA network of a location area where the dual-mode terminal is located.

5. The method according to claim 1, wherein the process of sending by the MSC the first message containing the calling party information to the access functional entity of the HRPD network comprises:

determining, by the MSC, whether the dual-mode terminal is in an active state based on a stored association in the MSC between an International Mobile Subscriber Identity (IMSI) and an HRPD state of the dual-mode terminal reported by the access functional entity of the HRPD network;

sending, by the MSC, the first message containing the calling party information to the access functional entity of the HPRD network via the IWS if the MSC determines the dual-mode terminal is in an active state.

6. The method according to claim 1, wherein the process of sending by the MSC the first message containing the calling party information to the access functional entity of the HRPD network comprises:

determining, by the IWS, whether the dual-mode terminal is in the active state based on a stored association in the IWS between the IMSI and the HRPD state of the dual-mode terminal reported by the access functional entity of the HRPD network;

sending, by the IWS, the first message containing the calling party information to the access functional entity of the HRPD network if the IWS determines the dual-mode terminal is in the active state.

7. The method according to claim 1, wherein the process of sending by the access functional entity of the HRPD network the second message containing the calling party information to the dual-mode terminal comprises:
  determining, by the access functional entity of the HRPD network, whether the dual-mode terminal is in an active state based on an association between the IMSI and the HRPD state of the dual-mode terminal which is stored in the access functional entity of the HRPD network;
  sending, by the access functional entity of the HRPD network, the second message containing the calling party information to the dual-mode terminal if the access functional entity of the HRPD network determines the dual-mode terminal is in an active state.

8. The method according to claim 1, wherein the process of sending by the MSC the first message containing the calling party information to the access functional entity of the HRPD network further comprises:
  adopting, by the MSC, a prescribed value as the calling party information in response to detecting the calling party information in the paging is unavailable.

9. The method according to claim 1, wherein the CDMA network comprises:
  a network based on a CDMA system, a network based on a CDMA2000 1x system, a network based on a C DMA 2000 1x Evolution Data and Voice (EVDV) system.

10. A Mobile Switching Center (MSC) for communication of a dual-mode terminal, wherein the MSC is configured to send a first message containing calling party information to an access functional entity of a High Rate Packet Data (HRPD) network via an InterWorking Solution (IWS) in response to receiving a paging to a dual-mode terminal in the HRPD network, and the MSC is further configured to:
  receive and store an association between an International Mobile Subscriber Identity (IMSI) and an HRPD state of the dual-mode terminal which is reported by the access functional entity of the HRPD network;
  determine whether the dual-mode terminal is in an active state based on the stored association in the MSC;
  send the first message containing the calling party information via the IWS if determining the dual-mode terminal is in an active state.

11. The MSC according to claim 10, wherein the first message comprises a Paging request message, and the MSC is further configured to send a Paging request message containing the calling party information to a Base Station Subsystem (BSS) of a Code Division Multiple Access (CDMA) network in a location area where the dual-mode terminal is located.

12. The MSC according to claim 10, wherein the MSC is further configured to adopt a prescribed value as the calling party information in response to detecting the calling party information in the paging is unavailable.

13. An access functional entity of a High Rate Packet Data (HRPD) network for communication of a dual-mode terminal, wherein
  the access functional entity of the HRPD network is configured to receive a first message containing calling party information via an InterWorking Solution (IWS) from a Mobile Switching Center (MSC) in response to receiving a paging to a dual-mode terminal in the HRPD network by the MSC;
  send a second message containing the calling party information to the dual-mode terminal in the HRPD network in response to receiving the first message;
  receive a Release Order sent by the dual-mode terminal if the dual-mode terminal determines to reject a paging according to the received calling party information.

14. The access functional entity of the HRPD network according to claim 13, wherein the first message comprises a Paging Request message, the second message comprises a Feature Notification message containing the calling party information and a General Page message, the access functional entity of the HRPD network is further configured to pack the Feature Notification message and the General Page message into a Media Access Control (MAC) packet.

15. The access functional entity of the HRPD network according to claim 13, wherein the access functional entity of the HRPD network is further configured to report an association between an International Mobile Subscriber Identity (IMSI) and an HRPD state of the dual-mode terminal to the MSC or the IWS.

16. The access functional entity of the HRPD network according to claim 13, wherein the access functional entity of the HRPD network is further configured to:
  determine whether the dual-mode terminal is in an active state based on an association between the IMSI and the HRPD state of the dual-mode terminal which is stored in the access functional entity of the HRPD network;
  send the second message containing the calling party information to the dual-mode terminal if determining the dual-mode terminal is in an active state.

17. A dual-mode terminal in a system comprising a Mobile Switching Center (MSC), an access functional entity of a High Rate Packet Data (HRPD) network and a dual-mode terminal, wherein the dual-mode terminal is configured to:
  receive a second message containing the calling party information to the dual-mode terminal, wherein the second message is sent by the access functional entity of the HRPD network in response to receiving a first message containing calling party information and the first message containing calling party information is sent by the MSC via an InterWorking Solution (IWS) in response to receiving a paging to the dual-mode terminal in the HRPD network;
  determine whether to accept or reject the paging according to the received calling party information;
  switch to a Code Division Multiple Access (CDMA) network and send a Paging Response message to a Base Station Subsystem (BSS) if the dual-mode terminal determines to accept the paging; and
  send a Release Order to the access functional entity of the HRPD network if the dual-mode terminal determines to reject the paging.

* * * * *